US010296538B2

(12) United States Patent
Jiang et al.

(10) Patent No.: US 10,296,538 B2
(45) Date of Patent: May 21, 2019

(54) METHOD FOR MATCHING IMAGES WITH CONTENT BASED ON REPRESENTATIONS OF KEYWORDS ASSOCIATED WITH THE CONTENT IN RESPONSE TO A SEARCH QUERY

(71) Applicant: Baidu USA LLC, Sunnyvale, CA (US)

(72) Inventors: Yifei Jiang, Sunnyvale, CA (US); Shuang Wu, Sunnyvale, CA (US); Dong Li, Sunnyvale, CA (US); Jiangtao Hu, Sunnyvale, CA (US); Fan Zhu, Sunnyvale, CA (US); Qi Kong, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 377 days.

(21) Appl. No.: 15/051,297

(22) Filed: Feb. 23, 2016

(65) Prior Publication Data

US 2017/0242875 A1    Aug. 24, 2017

(51) Int. Cl.
| | | |
|---|---|---|
| *G06F 16/58* | (2019.01) | |
| *G06F 16/51* | (2019.01) | |
| *G06F 16/248* | (2019.01) | |
| *G06F 16/9535* | (2019.01) | |
| *G06F 17/30* | (2006.01) | |

(52) U.S. Cl.
CPC ........ *G06F 16/5866* (2019.01); *G06F 16/248* (2019.01); *G06F 16/51* (2019.01); *G06F 16/9535* (2019.01); *G06F 17/3028* (2013.01); *G06F 17/30268* (2013.01); *G06F 17/30554* (2013.01); *G06F 17/30867* (2013.01)

(58) Field of Classification Search
CPC ........................................................ G06F 17/30
USPC .................................................. 707/748, 722
See application file for complete search history.

(56) References Cited

U.S. PATENT DOCUMENTS

| | | | | |
|---|---|---|---|---|
| 7,404,141 | B1 * | 7/2008 | Giljum ................ | G06F 17/3089 715/229 |
| 7,818,314 | B2 * | 10/2010 | Chowdhury ...... | G06F 17/30864 707/722 |
| 7,966,321 | B2 * | 6/2011 | Wolosin .............. | G06F 17/3087 707/728 |

(Continued)

*Primary Examiner* — Kim T Nguyen
(74) *Attorney, Agent, or Firm* — Womble Bond Dickinson (US) LLP

(57) ABSTRACT

According to one embodiment, a content analysis module receives content information of a content item, the content information including a plurality of first keywords associated with the content item. The content analysis module performs an analysis on the first keywords associated with the content item. A keyword classifier categories the first keywords into a plurality of categories based on the analysis, each category including one or more second keywords selected from the first keywords. For each of the categories, one or more images are identified based on the corresponding second keywords. A category/image mapping module generates a category/image mapping table for the content item to map each of the categories to the corresponding identified images. The category/image mapping table is utilized to match the content item to one of the images based on a subsequent category determined in response to a search query.

22 Claims, 11 Drawing Sheets

(56) References Cited

U.S. PATENT DOCUMENTS

| | | | | |
|---|---|---|---|---|
| 8,005,813 B2* | 8/2011 | Chowdhury | ...... | G06F 17/30675 707/708 |
| 8,380,698 B2* | 2/2013 | Sundaranatha | ... | G06F 17/30448 707/706 |
| 8,521,712 B2* | 8/2013 | Shah | ................ | G06F 17/30657 707/706 |
| 8,521,713 B2* | 8/2013 | Chowdhury | ...... | G06F 17/30675 707/706 |
| 8,756,219 B2* | 6/2014 | Chand | ............... | G06F 17/30864 707/721 |
| 9,836,482 B2* | 12/2017 | Majkowska | ...... | G06F 17/30277 |
| 9,852,156 B2* | 12/2017 | Petrou | ............... | G06F 17/30241 |

\* cited by examiner

METHOD FOR MATCHING IMAGES WITH CONTENT BASED ON REPRESENTATIONS OF KEYWORDS ASSOCIATED WITH THE CONTENT IN RESPONSE TO A SEARCH QUERY

FIELD OF THE INVENTION

Embodiments of the present invention relate generally to search content. More particularly, embodiments of the invention relate to search content with matching images.

BACKGROUND

Most search engines typically perform searching of Web pages during their operation from a browser running on a client device. A search engine receives a search term entered by a user and retrieves a search result list of Web pages associated with the search term. The search engine displays the search results as a series of subsets of a search list based on certain criteria. General criteria that is used during a search operation is whether the search term appears fully or partly on a given webpage, the number of times the search string appears in the search result, alphabetical order, etc. Further, the user can decide to open a link by clicking on the mouse button to open and browse. Some of the user interactions with the search results and/or user information may be monitored and collected by the search engine to provide better searches subsequently.

Typically, in response to a search query, a search is performed to identify and retrieve a list of content items. The content items are then returned to a search requester. A conventional search engine would return most of the content items as is without modifying. Some of the content items in the search result are just plain text or description, which may deem to be unattractive or boring. Sometimes content in a search result would be more presentable or attractive if the content items are prepared with certain images that are related to the content items. However, it is quite challenge to match appropriate images with content items.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1A:
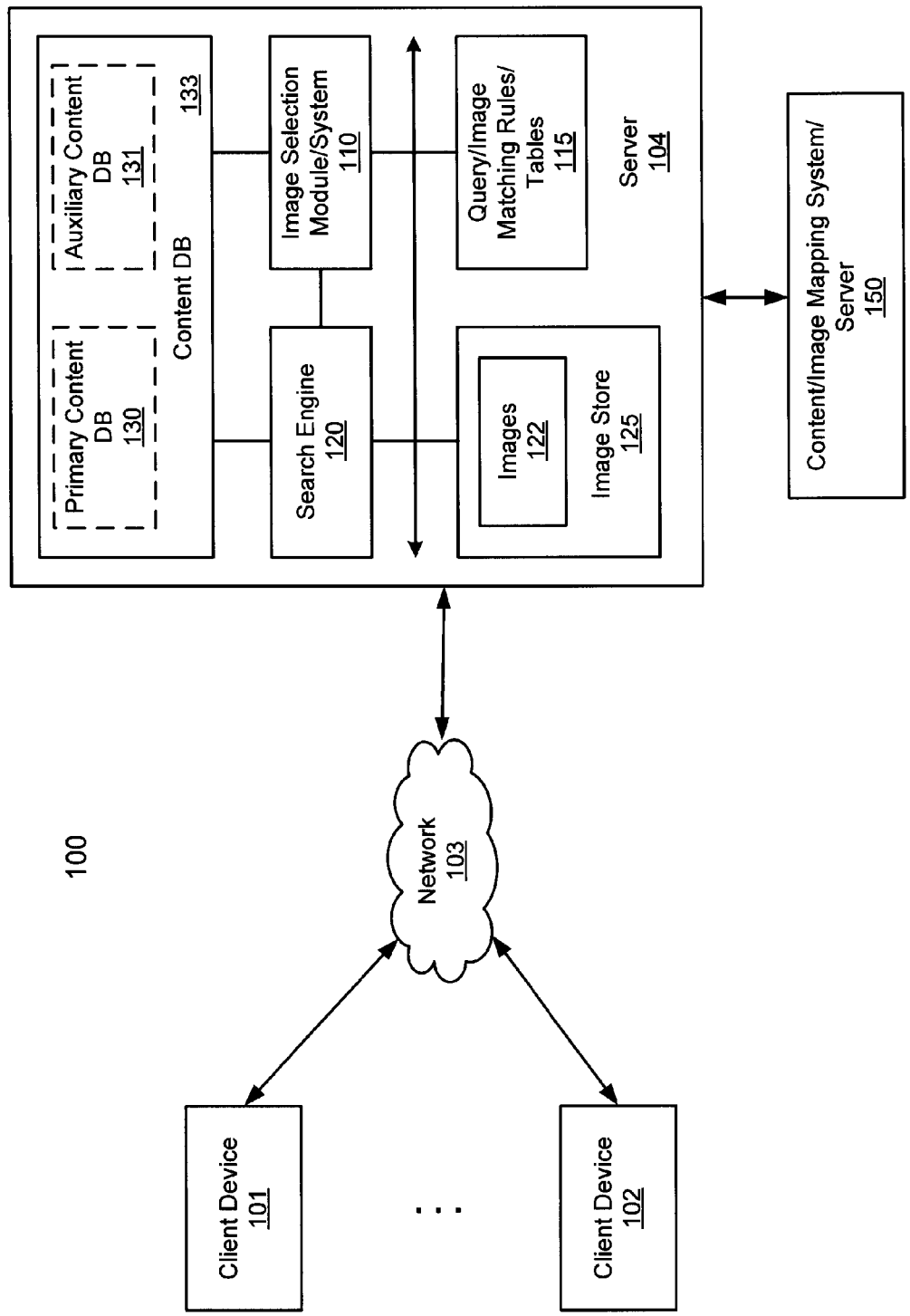
FIGS. 1A and 1B are block diagram illustrating an example of system configuration for matching images with content items according to some embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, content information of content items of a content database (DB) is analyzed. Each of the content items is associated with a number of keywords that have been preconfigured for search purposes. In one embodiment, a content analysis module performs an analysis on the keywords of each content item (referred to herein as first keywords). Based on the analysis, a keyword classifier categorizes the keywords into one or more categories. Each of the categories includes one or more of the keywords (or a phrase, a sentence) associated with the content item (referred to herein as second keywords). In one embodiment, for each of the categories, a keyword representation is determined based on the keywords associated with the corresponding category. A keyword representation represents the keywords of the corresponding category. Alternatively, a keyword presentation is also referred to as a category representation or category identifier (ID) representing a category of one or more keywords. A category-image (category/image) mapping module generates a category/image mapping table for the content item to map each of the categories to a set of one or more images. Thus, a category/image mapping table is generated for each of the content items, i.e., one category/image mapping table for one content item.

According to another aspect of the invention, when a search query is received for searching content from a client, a search engine performs a search in a content database or via a content server to identify a list of one or more content items based on the search query. In addition, one or more search terms (e.g., keywords) of the search query are analyzed to determine a category associated with the search terms. For each of the content items found by the search engine from the content database or via the content server, a category/image mapping table is identified and retrieved for the content item. For example, a category/image mapping table of a content item may be identified based on a content identifier (ID) that identifies the content item. A search or lookup operation is performed in the category/image mapping table based on the determined category to identify one or more images that have been mapped or assigned to the determined category. One of the identified images is then selected based on an image selection algorithm or process. The selected image is then incorporated or integrated with the content item and the integrated content item is then transmitted to the client as part of a search result. Note that throughout this application, a table is utilized as an example of a data structure for the purpose of illustration. It will be appreciated that other types or formats of data structures or databases may also be applicable.

Figure 1B:
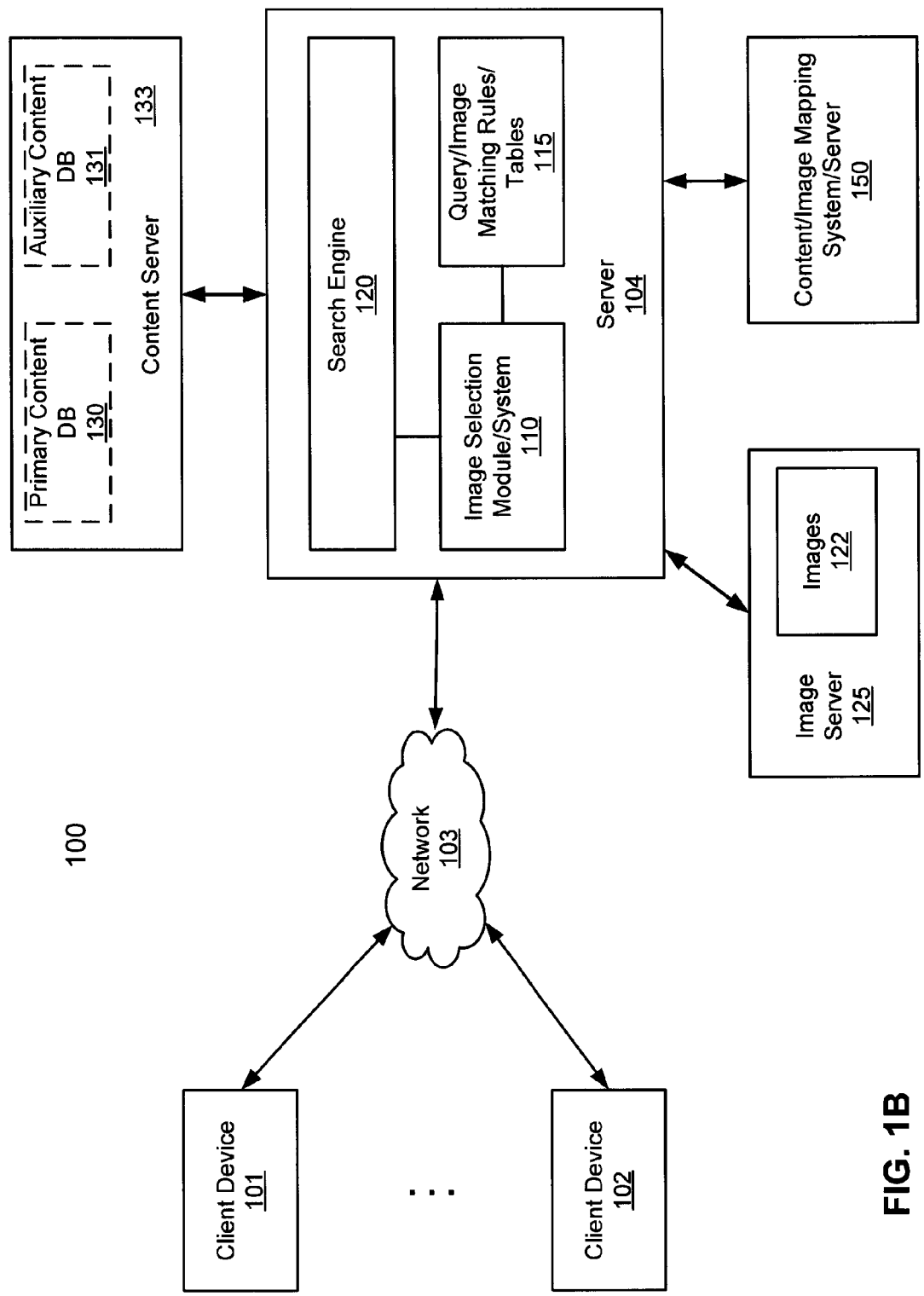

FIGS. 1A and 1B are block diagram illustrating an example of system configuration for matching images with content items according to some embodiments of the invention. Referring to FIG. 1A, system 100 includes, but is not limited to, one or more client devices 101-102 communicatively coupled to server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 103 may be any type of networks such as a local area network (LAN), a wide area network (WAN) such as the Internet, or a combination thereof, wired or wireless.

Server 104 may be any kind of servers or clusters of servers, such as Web or cloud servers, application servers, backend servers, or a combination thereof. In one embodiment, server 104 includes, but is not limited to, search engine 120, image selection module 110, and query/image matching rules 115. Server 104 further includes an interface (not shown) to allow a client such as client devices 101-102 to access resources or services provided by server 104. The interface may include a Web interface, an application programming interface (API), and/or a command line interface (CLI).

For example, a client, in this example, a user application of client device 101 (e.g., Web browser, mobile application), may send a search query to server 104 and the search query is received by search engine 120 via the interface over network 103. In response to the search query, search engine 120 extracts one or more keywords (also referred to as search terms) from the search query. Search engine 120 performs a search in content database 133, which may include primary content database 130 and/or auxiliary content database 131, to identify a list of content items that are related to the keywords. Primary content database 130 (also referred to as a master content database) may be a general content database, while auxiliary content database 131 (also referred to as a secondary content database) may be a special content database. Search engine 120 returns a search result page having at least some of the content items in the list to client device 101 to be presented therein. Search engine 120 may be a Baidu® search engine available from Baidu, Inc. or alternatively, search engine 120 may represent a Google® search engine, a Microsoft Bing™ search engine, a Yahoo® search engine, or some other search engines.

A search engine, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines also maintain real-time information by running an algorithm on a web crawler.

Web search engines work by storing information about many web pages, which they retrieve from the hypertext markup language (HTML) markup of the pages. These pages are retrieved by a Web crawler, which is an automated Web crawler which follows every link on the site. The search engine then analyzes the contents of each page to determine how it should be indexed (for example, words can be extracted from the titles, page content, headings, or special fields called meta tags). Data about web pages are stored in an index database for use in later queries. The index helps find information relating to the query as quickly as possible.

When a user enters a query into a search engine (typically by using keywords), the engine examines its index and provides a listing of best-matching web pages according to its criteria, usually with a short summary containing the document's title and sometimes parts of the text. The index is built from the information stored with the data and the method by which the information is indexed. The search engine looks for the words or phrases exactly as entered. Some search engines provide an advanced feature called proximity search, which allows users to define the distance between keywords. There is also concept-based searching where the research involves using statistical analysis on pages containing the words or phrases you search for. As well, natural language queries allow the user to type a question in the same form one would ask it to a human.

The usefulness of a search engine depends on the relevance of the result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

Referring back to FIG. 1A, according to one embodiment, in response to a search query received at server 104 from a client device, in this example, client device 101, search engine 120 performs a search in content database 133, such as primary content database 130 and/or auxiliary content database 131, to generate a list of content items (referred to as first content items). Each of the content items may be associated with a particular Web page of a particular Web site of a particular content provider via a uniform resource link (URL) and/or a uniform resource identifier (URI). In one embodiment, primary content database 130 stores general content items that have been collected by network crawlers (e.g., unsponsored content). Auxiliary content database 135 stores specific or special content items that are associated with specific, known, or predetermined content providers (e.g., sponsored content). Alternatively, content database 133 may be implemented as a single database without distinguishing primary content database 131 from auxiliary content database 132.

Network crawlers or Web crawlers are programs that automatically traverse the network's hypertext structure. In practice, the network crawlers may run on separate computers or servers, each of which is configured to execute one or more processes or threads that download documents from URLs. The network crawlers receive the assigned URLs and download the documents at those URLs. The network crawlers may also retrieve documents that are referenced by the retrieved documents to be processed by a content processing system (not shown) and/or search engine 120. Network crawlers can use various protocols to download pages associated with URLs, such as hypertext transport protocol (HTTP) and file transfer protocol (FTP).

In addition, according to one embodiment, image selection module or system 110 searches based on the keywords associated with the search query in content-image (content/image) mapping rules or tables 115 (also referred to as content/image matching rules or tables) to identify a list of image IDs identifying images that are related to the keywords. Content/image matching rules/tables 115 may be implemented in a variety of data structures such as a table or database. Based on the image IDs, a list of image candidates can be identified and retrieved from images 123 stored in image store 125, where image store 125 may also store image metadata describing images 122 (not shown). In one embodiment, images 122 and their respective metadata may be obtained by one or more image crawlers that are designed to craw the networks to collect images as well as their surrounding metadata. Images 122 may be non-privileged, non-copyrightable, properly licensed images, or any other authorized images. The image candidates may be ranked based on a relevancy score or matching degree between the keywords and the image candidates, which may be determined in view of the image metadata. For each of the content items found in content database 133, an image is selected from the list of image candidates to be associated with the content item. The selected image may be incorporated with the content item to generate an incorporated content item. For example, the selected image may serve as a background image to the content item. The list of incorporated content items and images is returned to client device 101 as part of a search result.

According to one embodiment, content/image mapping rules 115 may be previously compiled and generated prior to receiving the search query (e.g., offline). The set of content/image matching rules 115 is configured to map a category of one or more keywords to one or more image identifiers (IDs) identifying one or more images. The keywords may be identified as the keywords that are more likely be used in search queries. Such keywords may be identified based on an analysis or tracking of user searching activities or search history, which may be compiled for a period of time.

In one embodiment, each of content items of a content database or content server is associated with a set of one or more keywords (or phrases, sentences). Such associated keywords, phrases, or sentences may be configured or specified by a content provider of the corresponding content item. The keywords, phrases, or sentences may be used for searching purpose based on a search term for the purpose of identifying the corresponding content item in the content database or content server. For each of the content items, the associated keywords, phrases, or sentences are analyzed, for example, by content/image mapping system 150, which may be a separate system or server communicatively coupled to server 104. The keywords, phrases, or sentences of a content items are categorized into one or more categories. Each category contains at least a subset of the keywords, phrases, or sentences associated with the content item. For the purpose of illustration a keyword is utilized to demonstrate the image mapping techniques, however, the same or similar techniques may also be applied to phrases and/or sentences associated with a content item.

For each category of keywords, a keyword representation (also referred to as a category representation) is determined. The keyword representation may be determined by performing an analysis (e.g., a latent semantic analysis) on the keywords. Based on the keyword representation, one or more images are identified, for example, by searching via an image search system based on the keyword representation. A content/image mapping table is then created for that particular content item, which may become a part of content/image mapping rules or tables 115. The content/image mapping table includes multiple entries, each entry corresponding to one of the categories associated with the keywords of the content item. Each entry maps a keyword representation to one or more image IDs identifying one or more images.

Note that, a content/image mapping table is a per-content item mapping table, i.e., each content item in content database/server 133 would be associated with its own content/image mapping table. Most or all of the above operations are performed offline, i.e., prior to receiving searching queries for searching content in content database/server 133. In other words, content/image mapping tables for the content items of content database/server 133 are created prior to searching in the content database/server 133. When there is a change or update in content database/server 133, the corresponding content/image mapping tables may also be updated. Therefore, according to one embodiment, content/image mapping system 150 and content database/server 133 may be periodically synchronized.

Subsequently when a search query is received by search engine 120 from a client device for searching content, a search is performed in content database 133 to retrieve a list of content items. In addition, an analysis is performed, for example, by image selection module/system 110, on the query to determine one or more keywords associated with the query. The determined keywords may be the keywords included in the search query. The determined keywords may further include certain keywords that are semantically similar or have the same meaning of the keywords originally in the search query (e.g., synonymous words or phrases). For each of the content items found or retrieved by search engine 120, a content/image mapping table corresponding to the content item is identified from content/image mapping rules/tables 115.

Based on the keywords, analysis is performed and a category or a keyword representation for the keywords is determined. Based on the category or keyword representation, a list of one or more images are identified from the corresponding content/image mapping table. One image may then be selected from the identified images and the selected image is then incorporated with content item. For example, an image may be utilized as a background image for the content item. The content items integrated with the images are then returned as part of search result to the client device. As a result, the search result may appear to be more attractive or not to be boring.

Note that the configuration of server 104 has been described for the purpose of illustration only. Server 104 may be a Web server to provide a frontend search service to a variety of end user devices. Alternatively server 104 may be an application server or backend server that provides specific or special content search services to a frontend server (e.g., Web server or a general content server), and to match and/or integrate images with content items of a content database or server. Content/image mapping system 150 may also be implemented as a separate server, which is responsible for creating content/image mapping rules or tables 115 based on the content items and their respective associated keywords of content database or server 133.

Other architectures or configurations may also be applicable. For example, as shown in FIG. 1B, content database 133 may be maintained and hosted in a separate server as a content server over a network. Similarly, image store 125 may be maintained and hosted in a separate server as an image server having an image searching engine therein. Servers 133 and 125 may be Web servers, application servers, or backend servers. Content server 133 and/or image server 125 may be organized and provided by the same entity or organization as of server 104. Alternatively, content server 133 and/or image server 125 may be maintained or hosted by separate entities or organizations (e.g., third-party providers), which are responsible for collecting contents in content databases 130-131 and images 122 and their metadata.

Also note that content database/server 133 may include primary content database 130 and auxiliary content database 131. Primary content database 130 may also be implemented or maintained in a separate content server, referred to as a primary content server. Similarly, auxiliary content database 131 may be implemented or maintained in a separate content sever, referred to as an auxiliary content server. The content items obtained from both content databases 130-131 may be matched with images obtained from image store/server 125 using a variety of matching formulas. Alternatively, only content items obtained from one of primary content database 130 and auxiliary content database 131 will be matched with images obtained from image store/server 125. For example, content items obtained from auxiliary content database 131 (e.g., sponsored content) will be matched with the images obtained from image store/server 125, while content items obtain from primary content database 130 (e.g., general content) will be returned to the client device without modification as part of the search result.

Figure 2:
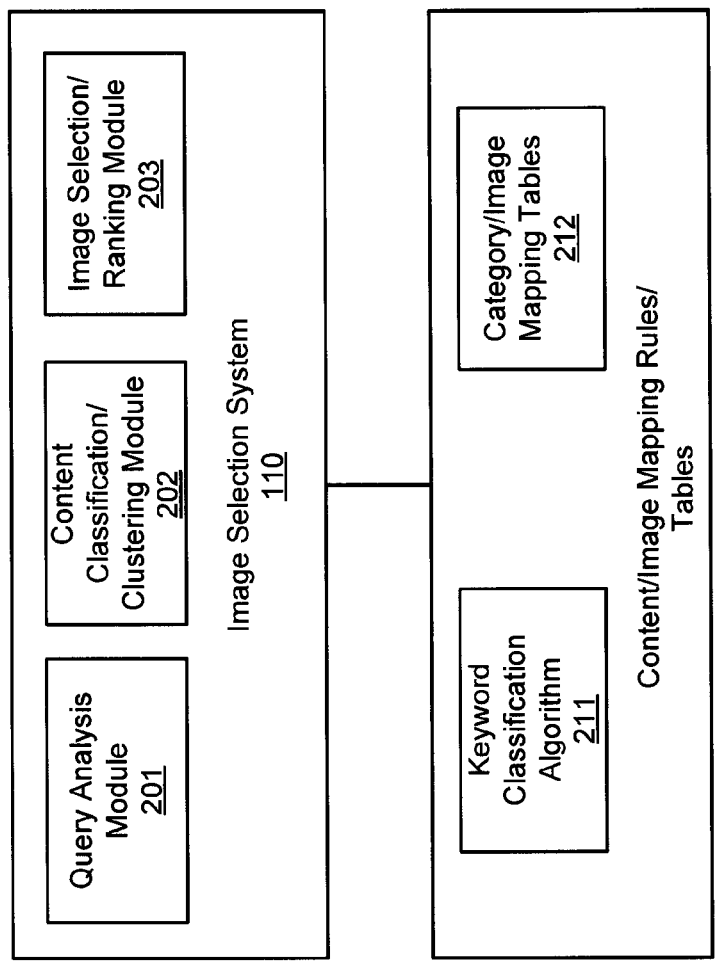
FIG. 2 is a block diagram illustrating an example of an image selection system according to one embodiment of the invention.

FIG. 2 is a block diagram illustrating an example of an image selection system according to one embodiment of the invention. System 200 may be implemented as part of server 104 of FIGS. 1A-1B. Alternatively, system 200 may be implemented as a standalone system or server that is communicatively coupled to server 104, for example, via an application programming interface (API) or over a network. Referring to FIG. 2, system 200 includes, but is not limited to, image selection module or system 110 and content/image mapping tables or rules 115 as described above. Image selection module 110 may be communicatively coupled to search engine 120 of FIGS. 1A-1B, for example, via an API or over a network. Content/image mapping tables 115 include keyword classification algorithms or methods 211 and category/image mapping tables 212. Note that again, keyword classification algorithms 211 and category/image mapping tables 212 may be implemented in a variety of data structures, algorithms, rules, etc. For example, keyword classification algorithms 211 may be implemented in a form of a keyword-category (keyword/category) mapping table that maps each keyword to a predetermined category. Alternatively, keyword classification algorithms 211 may be implemented as a set of libraries accessible via an API, which can performs an analysis in real-time according to a keyword analysis method, such as, for example, a latent semantic analysis.

As described above, when a search query is received from a client (e.g., a client device or a frontend server), search engine 120 performs a search in a content database or via a content server based on one or more search terms (e.g., keywords) to identify and retrieve a list of one or more content items. A content item may be in a form of texts, a description, a paragraph, or any other types or forms of content (e.g., graphical content). For each of the content items found in the search, search engine 120 communicates with image selection module 110 to identify and select an image to be associated with the content item, for example, as part of a background image or complemented image. In one embodiment, image selection module 110 receives from the search engine at least a content item or a content ID identifying the content item. Image selection module 110 may further receive a search query and/or search terms of the search query on which the search was based to identify the content item.

Figure 3:
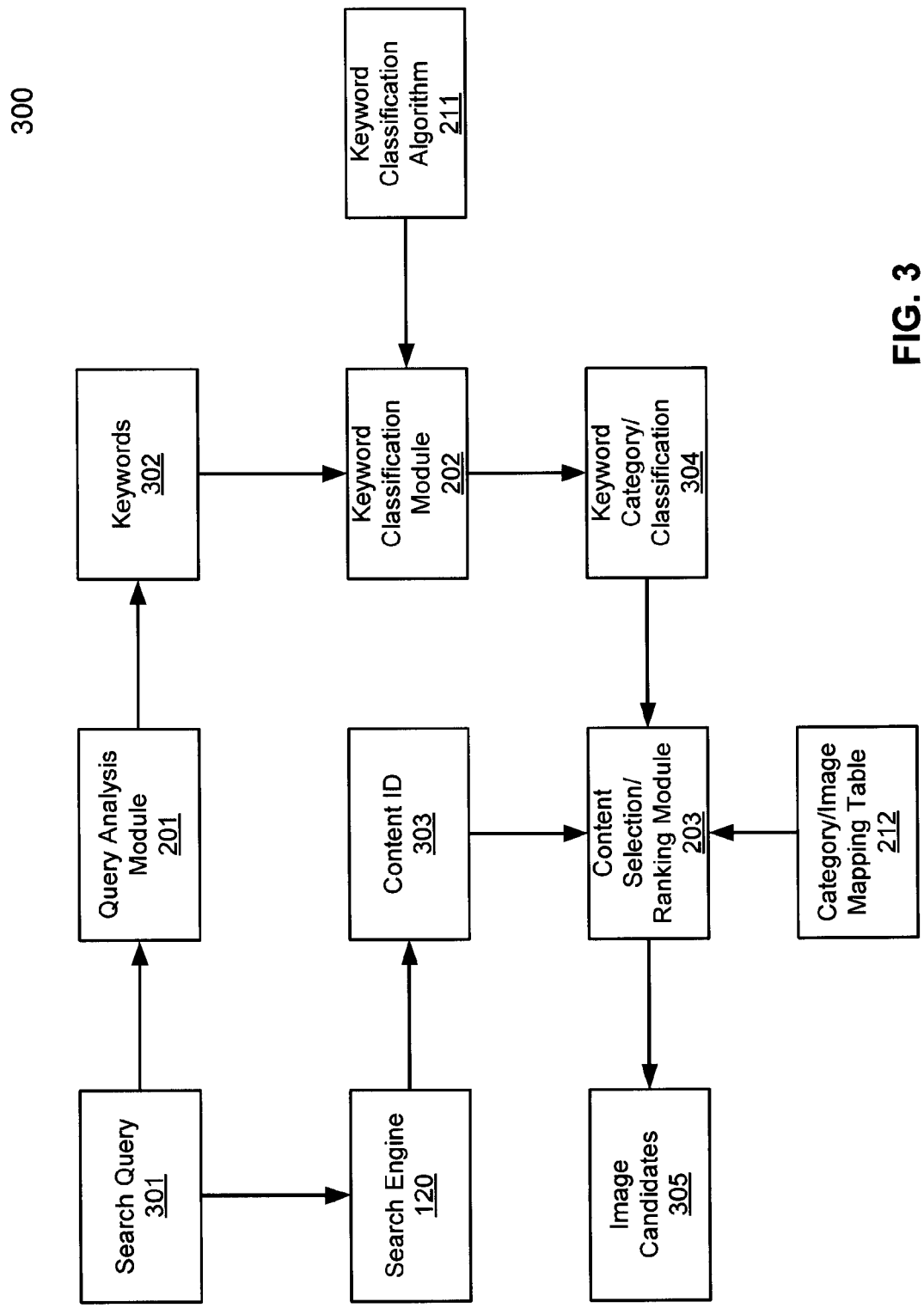
FIG. 3 is a processing flow diagram illustrating a process for matching images with content according to one embodiment of the invention.

FIG. 3 is a processing flow diagram illustrating a process for matching images with content according to one embodiment of the invention. Process 300 may be performed by system 200 of FIG. 2. Referring to FIGS. 2 and 3, in response to search query 301 or search terms of search query 301, query analysis module 201 performs an analysis on the search terms to derive a set of keywords 302 that are associated with the search terms. Keywords 302 may be those included in the search terms of search query 301. Alternatively, keywords 302 may further include additional keywords that are semantically related to the search terms of search query 301, which may be determined based on the analysis. For example, query analysis module 201 may perform a latent semantic analysis on the search terms to derive additional keywords that are semantically related to the search terms of search query 301. The analysis may also remove some of the keywords from search query 301 that deem to be unrelated to contradict to an intent of a search requester.

A latent semantic analysis (LSA) is a technique in natural language processing. in particular distributional semantics, of analyzing relationships between a set of documents and the terms they contain by producing a set of concepts related to the documents and terms. LSA assumes that words that are close in meaning will occur in similar pieces of text. A matrix containing word counts per paragraph (rows represent unique words and columns represent each paragraph) is constructed from a large piece of text and a mathematical technique called singular value decomposition (SVD) is used to reduce the number of rows while preserving the similarity structure among columns. Words are then compared by taking the cosine of the angle between the two vectors (or the dot product between the normalizations of the two vectors) formed by any two rows. Values close to 1 represent very similar words while values close to 0 represent very dissimilar words.

Based on keywords 302, content classifier or classification module 202 (also referred to as a keyword classifier, keyword classification module, keyword clustering module) analyzes keywords 302 to determine one or more categories (or groups, clusters) 304 of the keywords. In one embodiment, for each of the categories 304, a keyword representation (also referred to as a category representation) is determined from the keywords associated with that particular category. A keyword representation may be selected from the keywords of the same category. Alternatively, a keyword representation may be semantically related to the keywords of the category, for example, using a latent semantic analysis on the keywords. A keyword representation of a group of keywords can sufficiently represent or describe a common meaning or common theme of the keywords. In one embodiment, a keyword representation includes one or more words that commonly exist in each of the keywords in the same category or group.

Based on content ID 303 representing a particular content item provided by search engine 120 in response to search query 301, image selection module 203 identifies and retrieves category/image mapping table 212 corresponding to the content item, which is identified by content ID 303.

Image selection module 203 searches or looks up in category/image mapping table 212 based on the keyword representation(s) or category representation(s) 304 to identify a list of one or more images or image IDs identifying the images 305 as image candidates. One of the image candidates 305 is then selected to be associated with the content item. The selected image may be selected based on a variety of image selection methods or algorithms. For example, image candidates 305 may be ranked according to a predetermined ranking algorithm and an image having to highest ranking may be selected for content item. The selected image may be integrated with the content item, which may be returned by search engine 120 as a part of a search result.

Figure 4:
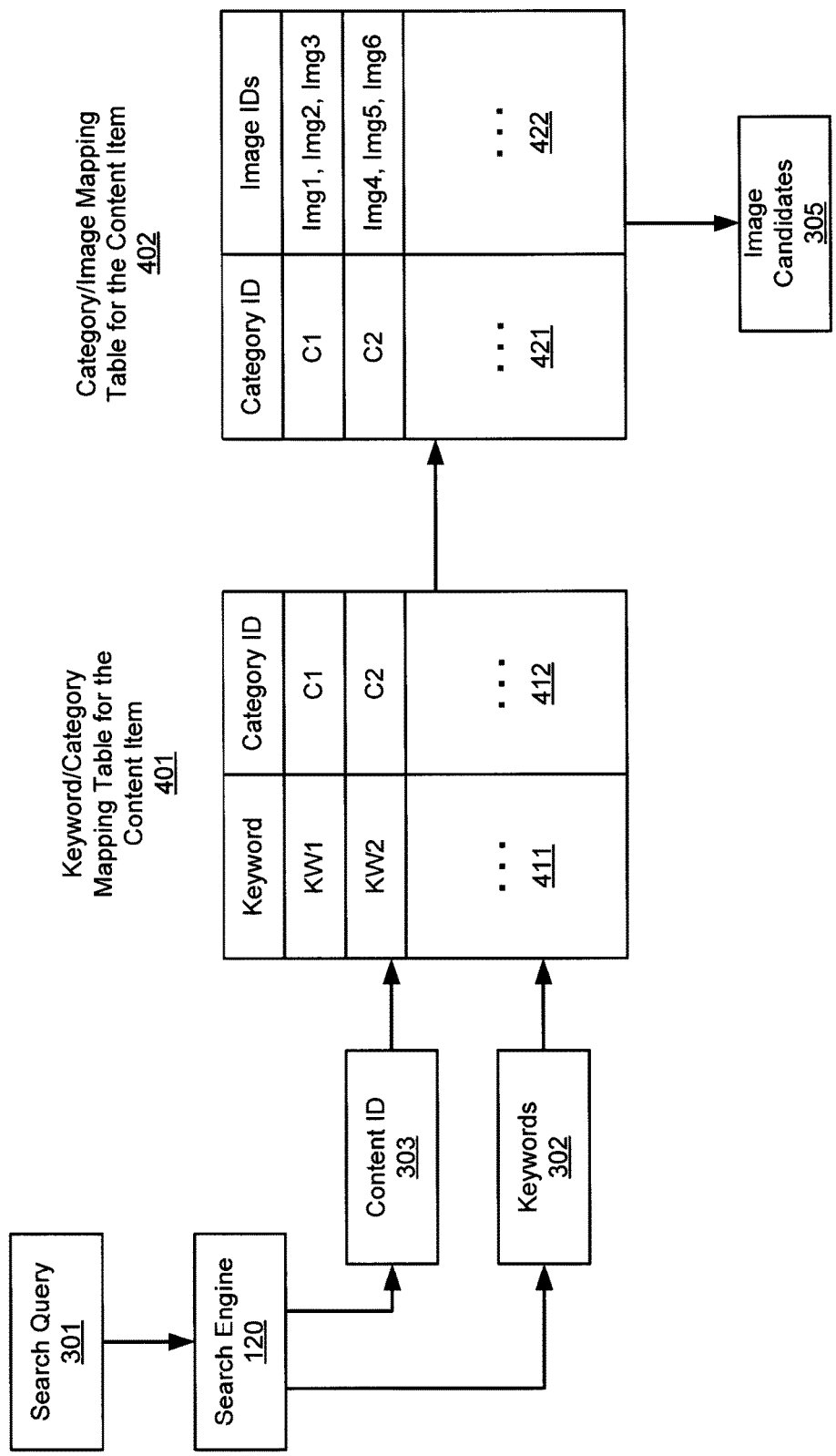
FIG. 4 is a processing flow diagram illustrating a process for matching images with content items according to another embodiment of the invention.

FIG. 4 is a processing flow diagram illustrating a process for matching images with content items according to another embodiment of the invention. Referring to FIG. 4, in this example, keyword/category mapping table 401 for a particular content item may be identified based on content ID 303 that identifies a content item. Note that keyword/category mapping table 401 may be implemented as part of keyword classification rules or algorithms 211 of FIG. 2. Keyword/category mapping table 401 may be identified from a pool of keyword/category mapping tables 211 associated with many content items, which may be stored in a persistent storage device (e.g., a hard disk). Keyword/category mapping table 401 includes a number of mapping entries. Each mapping entry maps one or more keywords 411 to one or more of categories 412.

Thus, based on one or more keywords 302, the corresponding category ID(s) 412 are identified. Category ID(s) 412 may also be referred to as keyword/category representation(s). Based on content ID 303, category/image mapping table 402 associated with content ID 303 is identified. Category/image mapping table 402 includes a number of mapping entries, each entry mapping a category or category ID to one or more images 305 or image IDs identifying images 305. Note that in this example, a mapping table is utilized to map a keyword to a category as part of tables 401-402. However, other forms of mapping mechanisms may also be utilized. For example, a mapping mechanism may be implemented as a set of mapping algorithms or mapping rules in a library. The library may be exposed via an API to allow a client to determine a category or an image based on a keyword or a category, respectively.

Figure 5:
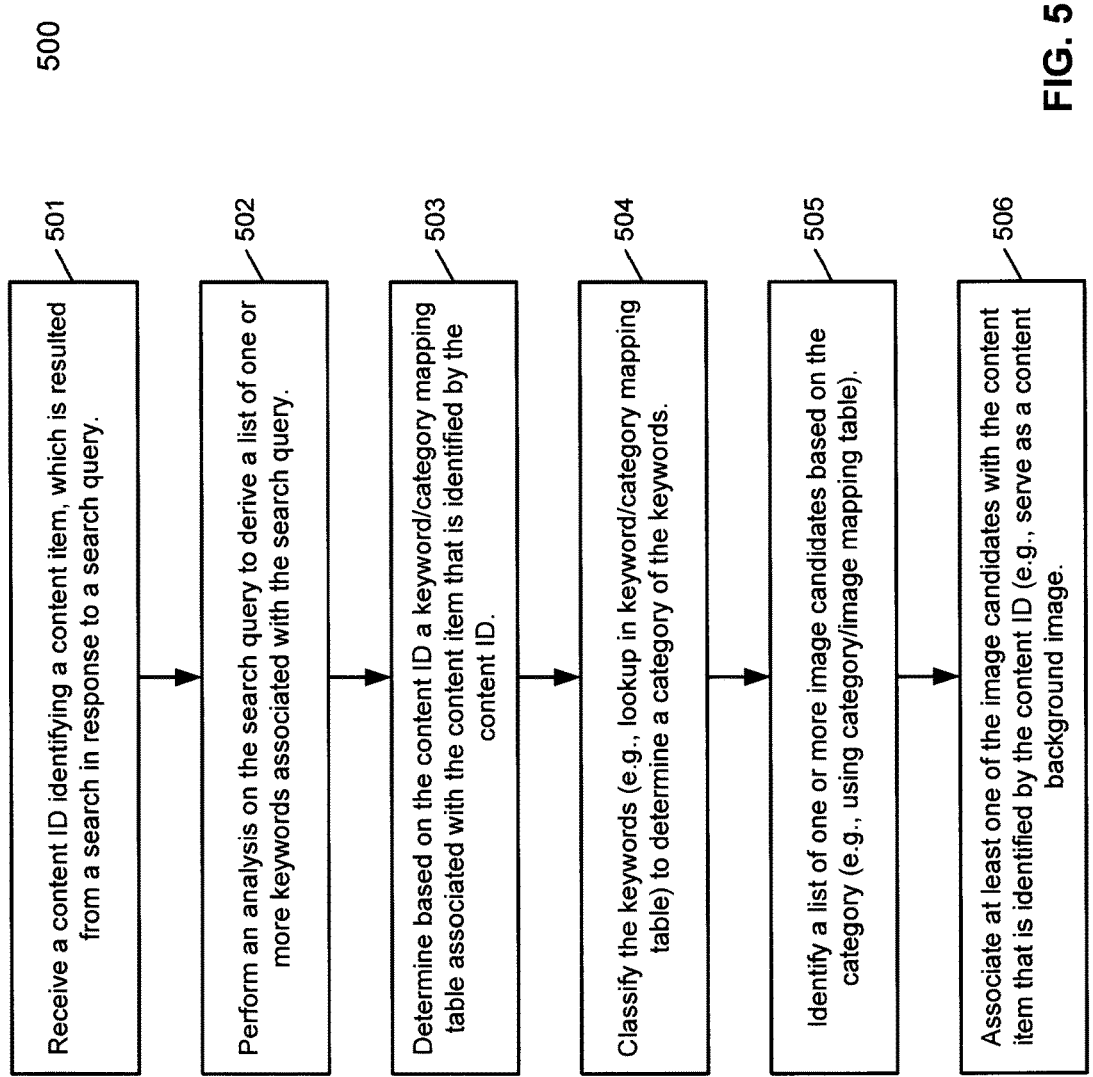
FIG. 5 is a flow diagram illustrating a process for matching images with content items according to one embodiment of the invention.

FIG. 5 is a flow diagram illustrating a process for matching images with content items according to one embodiment of the invention. Process 500 may be performed by processing logic which may include software, hardware, or a combination thereof. For example, process 500 may be performed by system 200 of FIG. 2. Referring to FIG. 5, at block 501, processing logic receives a content ID identifying a particular content item, which may be resulted in a search in response to a search query. At block 502, processing logic examines or performs an analysis on the search query or search terms of the search query to derive a list of one or more keywords associated with the search query. At block 503, processing logic determines a keyword/category mapping table associated with the content item based on the content ID.

At block 504, processing logic looks up in the keyword/category mapping table to determine one or more categories or category IDs based on the keywords. Alternatively, processing logic may invoke a category determination algorithm to determine the category or categories of the keywords. In one embodiment, the categories or category IDs may be keyword representations representing the keywords. Based on the category ID(s), at block 505, processing logic looks up in the category/image mapping table corresponding to the content item to determine one or more images. At block 506, processing logic associates at least one image selected from the determined images with the content item identified by the content ID.

Figure 6:
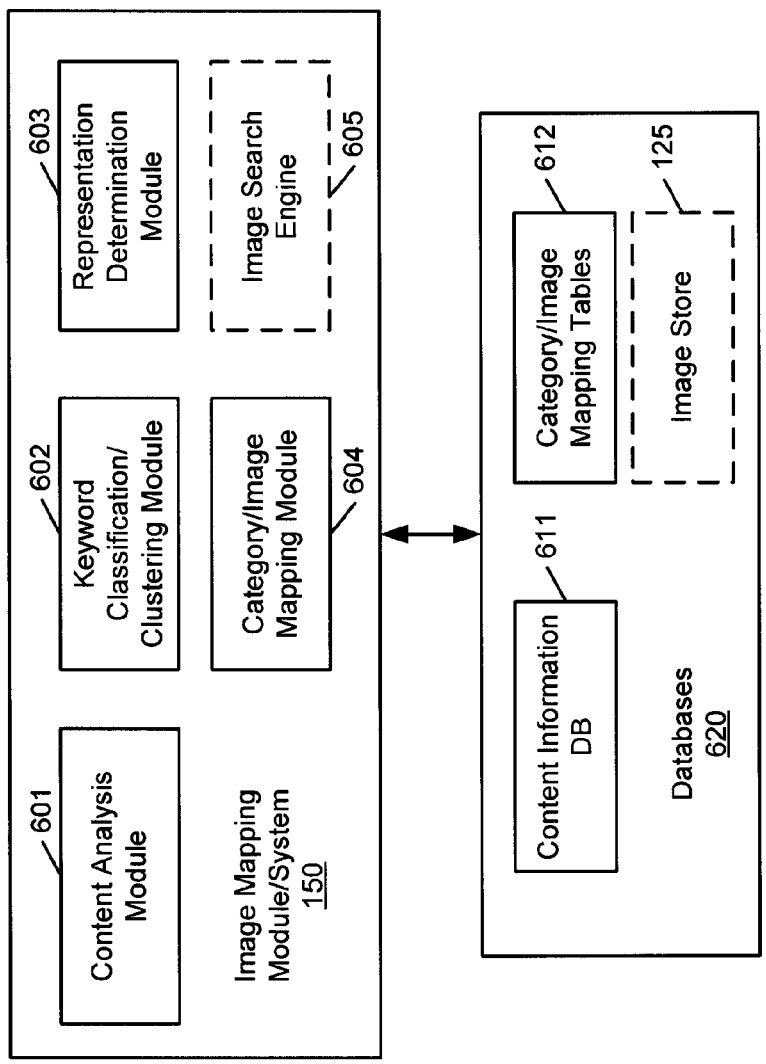
FIG. 6 is a block diagram illustrating an example of an image mapping system according to one embodiment of the invention.

FIG. 6 is a block diagram illustrating an example of an image mapping system according to one embodiment of the invention. System 600 is responsible for compiling and generating content/image mapping rules or tables 115 of FIGS. 1A-1B. Referring to FIG. 6, image mapping module or system 150 includes, but is not limited to, content analysis module 601, keyword classifier or classification module 602, keyword representation determination module 603, category/image mapping module 604, and optional image search module or engine 605. Some or all of these modules may be implemented in software, hardware, or a combination thereof. For example, some or all of modules 601-605 may be loaded in a memory and executed by one or more processors (not shown).

In one embodiment, image mapping module or system 150 is communicatively coupled to one or more databases 620 storing content information database 611 and category/image mapping tables 612, which may be implemented in a variety of data structures or formats. Databases 620 may be stored in a persistent storage device, locally or remotely. Content information DB 611 stores content information or metadata of content items, which may be part of content DB 133 of FIGS. 1A-1B. The content information may be periodically obtained in response to updates of content stored in content DB 133 of FIGS. 1A-1B. Content information of a content item may include a variety of information or data concerning the corresponding item, such as, for example, a title or description of the content item. The content information may further include certain accessing history such as related search queries that have been used to search and identify the content item in the past, which may be obtained from a history log of prior user accessing information of the content item. The content information may further include a set of one or keywords associated with the corresponding content item. The keywords may be utilized for searching purpose of the content item. The keywords may be specified or provided by a content provider that provides the corresponding content item.

Figure 7:
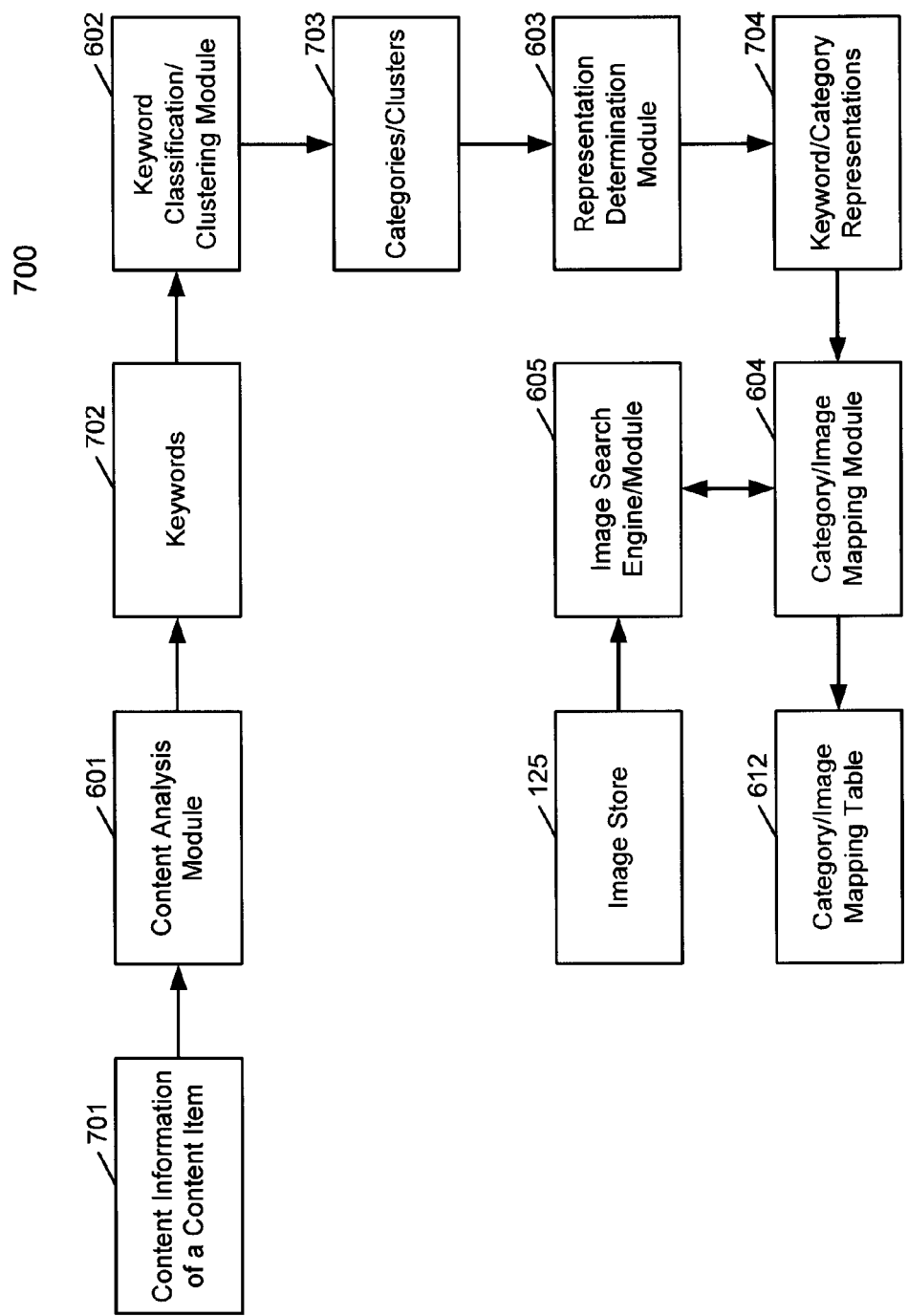
FIG. 7 is a processing flow diagram illustrating a process for categorizing keywords associated with a content item according to one embodiment of the invention.

FIG. 7 is a processing flow diagram illustrating a process for categorizing keywords associated with a content item according to one embodiment of the invention. Referring to FIGS. 6 and 7, the content information 701 of each of the content items is analyzed by content analysis module 601 to determine one or more categories to which the content item belongs. Content information 701 may be obtained from content information database 611. In one embodiment, content analysis module 601 obtains a list keywords 702 from content information 701. Keywords 702 have been associated with a content item corresponding to content information 701. As described above, the keywords may have been defined and associated with the content item by a content provider of that particular content item. The keywords may be used to match the search terms of a search query in order to identify and retrieve the content item as a part of a search result. For example, if a search term of a search query matches one or more of the keywords previously defined and associated with a particular content item during a search, that particular content item will be identified and returned to a client that initiated the search query.

Based on the analysis of keywords 702 associated with a content item, according to one embodiment, keyword classifier or classification module 602 classifies or groups keywords 702 into one or more categories of keywords. Each category may include at least a subset of keywords 702, where groups or categories of keywords may or may not be overlapped from each other. Keyword classification module 602 may perform a latent semantic analysis on keywords 702 to derive one or more categories or groups 703. The analysis may be performed based on a variety of factors or metadata surrounding keywords 702 and content information 701 associated with the corresponding content item. For example, keywords 702 may be categorized based on semantic similarities of the keywords, prior user interactions with the keywords (e.g., search queries), prior user interactions with the content item in view of the keywords (e.g., a click through rate), etc.

According to one embodiment, for each of categories 703, keyword representation determination module 603 analyzes one or more keywords associated with the corresponding category to determine a keyword representation that represents the keywords of the corresponding category. The keyword representation is also referred to as a category representation as it literally represents the corresponding category. A keyword representation may be determined using a variety of methods, processes, and/or algorithms, such as, for example, a latent semantic analysis on the associated keywords. For example, a keyword representation may have the same or similar meaning as of each of the keywords in the group. A keyword representation may represent the same or similar theme of the keywords in the group. Alternatively, a keyword representation may include one or more words that commonly exist in keywords of the group.

For each of the keyword representations, according to one embodiment, an image searching operation is performed, for example, by invoking an image search engine or system 605 in image store 125 to identify a list of one or more images based on the keyword representation. Image search engine or system 605 may be implemented locally as a library that can be accessed via an API or alternatively, it can be implemented as an image server having image search engine 605 and image store 125 therein over a network. Category/image mapping module 604 creates a category/image mapping table 612 for that particular content item. Category/image mapping table 612 includes a number of mapping entries. Each mapping entry maps a keyword or category representation to one or more images or image IDs identifying the image. Category/image mapping table 612 is also referred to as a representation/image mapping table, as it maps a keyword or category representation to one or more images. Category/image mapping table 612 is then delivered or transmitted from image mapping system 150 to server 104 to be utilized to search content in real time as part of category/image mapping rules or tables 115 of FIGS. 1A-1B.

Figure 8:
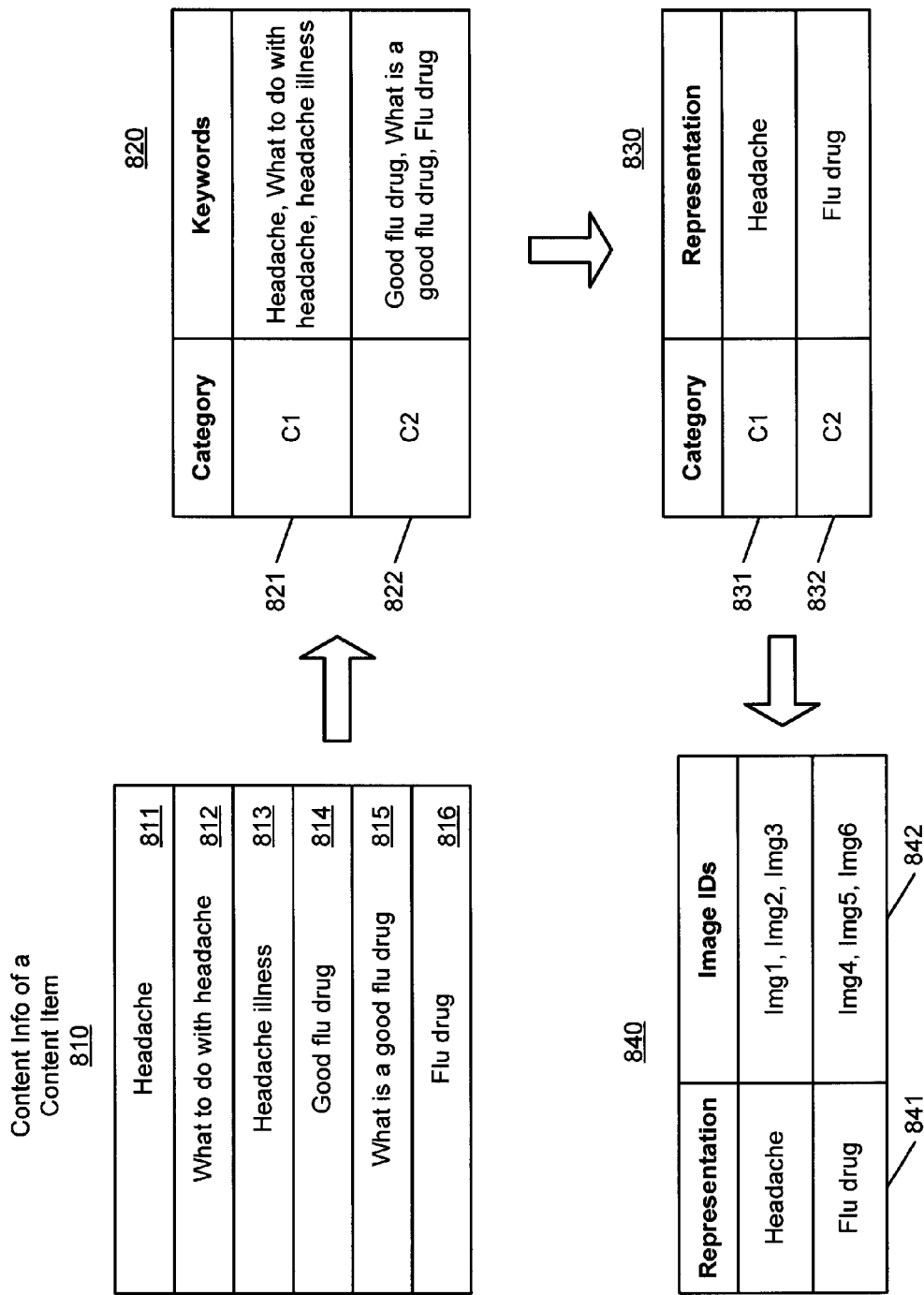
FIG. 8 is a block diagram illustrating an example of creating a category-image mapping table according to one embodiment of the invention.

FIG. 8 is a block diagram illustrating an example of creating a category-image mapping table according to one embodiment of the invention. Referring to FIG. 8, it is assumed content information 810 of a particular content item is received, where the content item may be one of many content items in a content database or content server. Amongst other data, content information 810 includes a set of keywords, phrases, or sentences 811-816. These keywords, phrases, or sentences 811-816 may be previously defined, specified, and associated with this particular content item, for example, by a content provider. The keywords, phrases, or sentences 811-816 are then analyzed to determine one or more categories or groups 820 having groups 821-822 of keywords, phrases, or sentences. The keywords, phrases, or sentences of groups or categories 821-822 may contain at least a subset of the keywords, phrases, or sentences 811-816 of content information 810.

In addition, a keyword representation (or category representation, group representation) is determined for each of categories 830 such as categories 831-832. In this example, category 831 includes a keyword presentation "headache" representing keywords 811-813, while category 832 includes a keyword representation "flu drug" representing keywords 814-816 in this example. In this particular example, a keyword representation represents a common word(s) in the corresponding group of keywords. However, other keyword representation determination methods or schemes may also be utilized. For each of the keyword representations in categories 831-832, an image search is conducted via image search system 605 to obtain a list of one or more images and a category/image mapping table 840 is created. In this example, category/image mapping table 840 includes mapping two mapping entries to map keyword representations 841 to one or more image IDs 842 identifying the corresponding images.

Thus, by mapping, searching, and identifying images based on a keyword/category representation, the matching between images and keywords associated with the keywords of content items and the keywords of search queries can be more accurate. In the example of as shown in FIG. 8, by categorizing and generating keyword representation, certain words that are not closely related or unimportant can be eliminated. For example, for category 821, the terms of "what to do with" and "illness" are eliminated for image search purposes. These words are considered as "noise" words, which may have a negative impact or disruption on searching images.

Figure 9:
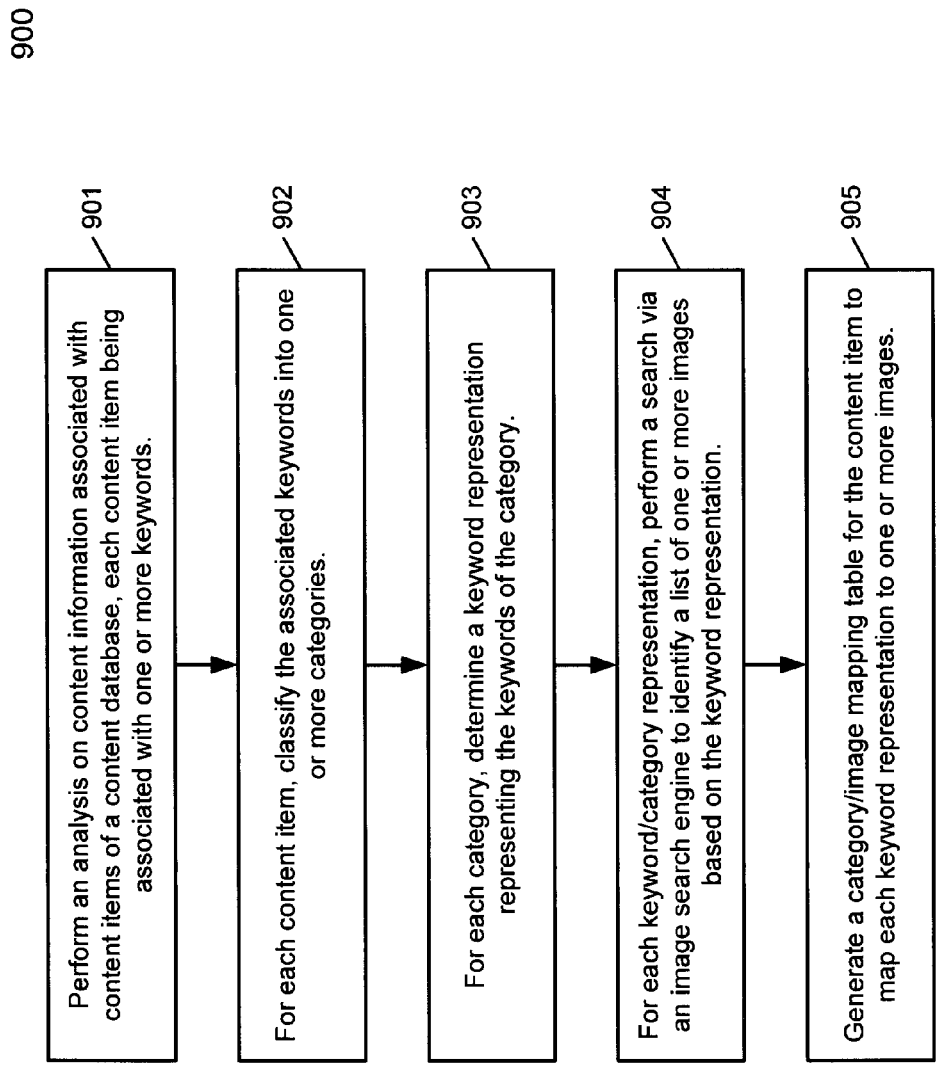
FIG. 9 is a flow diagram illustrating a process for creating a category-image mapping table according one embodiment of the invention.

FIG. 9 is a flow diagram illustrating a process for creating a category-image mapping table according one embodiment of the invention. Process 900 may be performed by processing logic which may include software, hardware, or a combination thereof. For example, process 900 may be performed by system 600 of FIG. 6. Referring to FIG. 9, at block 901, processing logic performs an analysis on content information associated with each of content items of a content database. Each content item of the content database is associated with a list of predefined keywords, terms, phrases, or sentences. For each of the content items, at block 902, processing classifies, categorizes, or groups the predefined keywords, terms, phrases, or sentences into one or more categories. For each of the categories, at block 903, processing logic determine a keyword (or category, group) representation representing the predefined keywords, terms, phrases, or sentences of the category. For each of the keyword representation, at block 904, processing logic performs a search via an image search engine to identify a list of one or more images based on the keyword representation. At block 905, processing logic generates a category/image mapping table for the corresponding content item. The category/image mapping table includes a number of mapping entries. Each mapping entry maps a keyword representation to one or more images or image IDs identifying the images.

The techniques described above can be applied to matching images with sponsored content. One type of the sponsored content is advertisement (Ads). For example, referring back to FIGS. 1A-1B, content database (DB) or server 133 may be an Ads database or Ads server. Each of the content items, e.g., Ads, is associated with a list of predefined keywords, terms, phrases, or sentences. These predefined keywords, terms, phrases, or sentences may be bidwords purchased, defined or specified by an Ads provider. In another embodiment, primary content DB 130 may store the general content generally available in a public network. Auxiliary content DB 131 may be an Ads DB. Some of the Ads may be just plain texts. By matching and integrating an image with the Ads, for example, as a background image, the Ads may be more appealing or attractive to users. Server 104 may be a Web server for searching content or alternatively, server 104 may be an Ads server.

Figure 10:
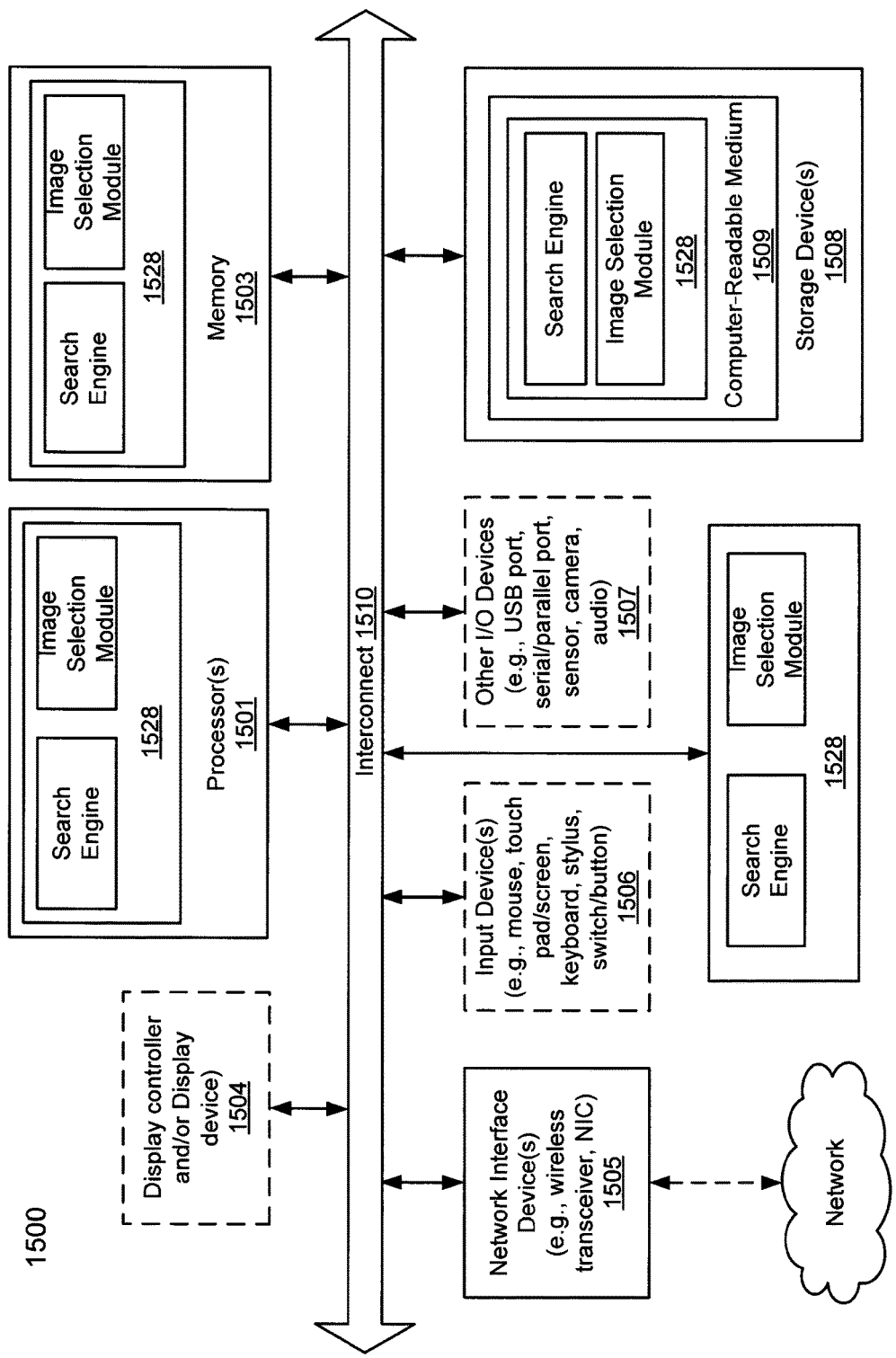
FIG. 10 is a block diagram illustrating a data processing system according to one embodiment.

FIG. 10 is a block diagram illustrating an example of a data processing system which may be used with one embodiment of the invention. For example, system 1500 may represents any of data processing systems described above performing any of the processes or methods described above, such as, for example, a client device or a server described above, such as, for example, server 104, content server 133, content/image mapping system/server 150, or image search engine/system/server 605, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC).

Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, a search engine, an encoder, an interaction logging module as described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for matching content items with images, the method comprising:
   receiving content information of a content item, the content item comprising a plaintext content component and being associated with a content identifier (ID), the content information including a plurality of first keywords associated with the content item, at least some of the plurality of first keywords being specified by a provider of the plaintext content component, wherein the content item was obtained from a content database;

performing an analysis on the first keywords associated with the content item;

categorizing the first keywords into a plurality of categories based on the analysis, each category including one or more second keywords selected from the first keywords;

for each of the categories, identifying one or more images based on the corresponding second keywords; and generating a category/image mapping table for the content item to map each of the categories to the corresponding identified images, wherein the category/image mapping table is associated with the content ID associated with the content item and identifiable by the content ID, wherein the category/image mapping table is utilized to associate the content item with one of the images based on a subsequent category determined in response to a subsequent search query associated with the content ID, the subsequent category corresponding to one of the plurality of categories, wherein a search result in response to the subsequent search query includes the content item and the of the images associated with the subsequent category integrated therein.

2. The method of claim 1, wherein the second keywords are a subset of the first keywords.

3. The method of claim 1, wherein the category/image mapping table includes a plurality of mapping entries, and wherein each mapping entry maps one of the categories to one or more images.

4. The method of claim 1, further comprising for each of the categories, determining a keyword representation representing the second keywords of the category, wherein the keyword representation is used to identifying the one or more images.

5. The method of claim 4, wherein the keyword representation is semantically related to each of the second keywords.

6. The method of claim 4, wherein the keyword representation of the second keywords includes one or more third keywords that commonly exist in each of the second keywords.

7. The method of claim 4, further comprising for each keyword representation of each category, searching in an image store via an image searching engine to identify and retrieve the one or more images based on the keyword representation.

8. The method of claim 1, further comprising:

receiving one or more search terms of a search query and a first content identifier (ID) identifying a first content item resulted from a search performed in response to a search query;

determining a first category based on the one or more search terms of the search query; and determining one or more first images from a first category/image mapping table based on the first category.

9. The method of claim 8, further comprising:

identifying the first category/image mapping table associated with the first content item based on the first content ID; and integrating the first content item with a second image selected from the first images.

10. A non-transitory machine-readable medium having instructions stored therein, which when executed by a processor, cause the processor to perform operations of matching content items with images, the operations comprising:

receiving content information of a content item, the content item comprising a plaintext content component and being associated with a content identifier (ID), the content information including a plurality of first keywords associated with the content item, at least some of the plurality of first keywords being specified by a provider of the plaintext content component, wherein the content item was obtained from a content database;

performing an analysis on the first keywords associated with the content item;

categorizing the first keywords into a plurality of categories based on the analysis, each category including one or more second keywords selected from the first keywords;

for each of the categories, identifying one or more images based on the corresponding second keywords; and generating a category/image mapping table for the content item to map each of the categories to the corresponding identified images, wherein the category/image mapping table is associated with the content ID associated with the content item and identifiable by the content ID, wherein the category/image mapping table is utilized to associate the content item with one of the images based on a subsequent category determined in response to a subsequent search query associated with the content ID, the subsequent category corresponding to one of the plurality of categories, wherein a search result in response to the subsequent search query includes the content item and the one of the images associated with the subsequent category integrated therein.

11. The non-transitory machine-readable medium of claim 10, wherein the second keywords are a subset of the first keywords.

12. The non-transitory machine-readable medium of claim 10, wherein the category/image mapping table includes a plurality of mapping entries, and wherein each mapping entry maps one of the categories to one or more images.

13. The non-transitory machine-readable medium of claim 10, wherein the operations further comprise, for each of the categories, determining a keyword representation representing the second keywords of the category, wherein the keyword representation is used to identifying the one or more images.

14. The non-transitory machine-readable medium of claim 13, wherein the keyword representation is semantically related to each of the second keywords.

15. The non-transitory machine-readable medium of claim 13, wherein the keyword representation of the second keywords includes one or more third keywords that commonly exist in each of the second keywords.

16. The non-transitory machine-readable medium of claim 13, wherein the operations further comprise, for each keyword representation of each category, searching in an image store via an image searching engine to identify and retrieve the one or more images based on the keyword representation.

17. The non-transitory machine-readable medium of claim 10, wherein the operations further comprise:

receiving one or more search terms of a search query and a first content identifier (ID) identifying a first content item resulted from a search performed in response to a search query;

determining a first category based on the one or more search terms of the search query; and determining one or more first images from a first category/image mapping table based on the first category.

18. The non-transitory machine-readable medium of claim 17, wherein the operations further comprise:
identifying the first category/image mapping table associated with the first content item based on the first content ID; and
integrating the first content item with a second image selected from the first images.

19. A data processing system, comprising:
a processor;
a content analysis module to receive content information of a content item, the content item comprising a plaintext content component and being associated with a content identifier (ID), the content information including a plurality of first keywords associated with the content item and to perform an analysis on the first keywords associated with the content item, at least some of the plurality of first keywords being specified by a provider of the plaintext content component, wherein the content item was obtained from a content;
a keyword classifier to categorize the first keywords into a plurality of categories based on the analysis, each category including one or more second keywords selected from the first keywords;
for each of the categories, an image search module to identify one or more images based on the corresponding second keywords; and
a category/image mapping module to generate a category/image mapping table for the content item to map each of the categories to corresponding identified images, wherein the category/image mapping table is associated with the content ID associated with the content item and identifiable by the content ID, wherein the category/image mapping table is utilized to associate the content item with one of the images based on a subsequent category determined in response to a subsequent search query associated with the content ID, the subsequent category corresponding to one of the plurality of categories, wherein a search result in response to the subsequent search query includes the content item and the one of the images associated with the subsequent category integrated therein.

20. The system of claim 19, wherein the second keywords are a subset of the first keywords.

21. The system of claim 19, wherein the category/image mapping table includes a plurality of mapping entries, and wherein each mapping entry maps one of the categories to one or more images.

22. The system of claim 19, further comprising a keyword representation determination module, for each of the categories, to determine a keyword representation representing the second keywords of the category, wherein the keyword representation is used to identifying the one or more images.

* * * * *